(12) United States Patent
Mitulal et al.

(10) Patent No.: US 12,199,886 B2
(45) Date of Patent: Jan. 14, 2025

(54) QUEUE PROTECTION USING A SHARED GLOBAL MEMORY RESERVE

(71) Applicant: Cisco Technology, Inc., San Jose, CA (US)

(72) Inventors: Vinod Mitulal, Santa Clara, CA (US); Krishnan Subramani, San Jose, CA (US); Peter Newman, Fremont, CA (US); Georges Akis, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/460,264

(22) Filed: Sep. 1, 2023

(65) Prior Publication Data

US 2023/0412523 A1 Dec. 21, 2023

Related U.S. Application Data

(63) Continuation of application No. 18/153,923, filed on Jan. 12, 2023, which is a continuation of application (Continued)

(51) Int. Cl.
*H04L 49/103* (2022.01)
*H04L 47/10* (2022.01)
(Continued)

(52) U.S. Cl.
CPC ............ *H04L 49/103* (2013.01); *H04L 47/29* (2013.01); *H04L 47/30* (2013.01); *H04L 47/32* (2013.01);

(Continued)

(58) Field of Classification Search
CPC ........... H04L 47/00–829; H04L 49/103; H04L 49/108; H04L 49/3036; H04L 49/9005; H04L 49/9084
See application file for complete search history.

(56) References Cited

U.S. PATENT DOCUMENTS

| | | | |
|---|---|---|---|
| 4,688,695 | A | 8/1987 | Hirohata |
| 5,263,003 | A | 11/1993 | Cowles et al. |

(Continued)

FOREIGN PATENT DOCUMENTS

| | | |
|---|---|---|
| CN | 1777147 A | 5/2006 |
| EP | 2228719 A1 | 9/2010 |

(Continued)

OTHER PUBLICATIONS

Long A., Jr., "Modeling the Reliability of RAID Sets," Dell Power Solutions, May 2008, 4 Pages.

(Continued)

*Primary Examiner* — Michael Thier
*Assistant Examiner* — Prince A Mensah
(74) *Attorney, Agent, or Firm* — Polsinelli P.C.

(57) ABSTRACT

The subject technology relates to the management of a shared buffer memory in a network switch. Systems, methods, and machine readable media are provided for receiving a data packet at a first network queue from among a plurality of network queues, determining if a fill level of a queue in a shared buffer of the network switch exceeds a dynamic queue threshold, and in an event that the fill level of the shared buffer exceeds the dynamic queue threshold, determining if a fill level of the first network queue is less than a static queue minimum threshold.

20 Claims, 5 Drawing Sheets

Related U.S. Application Data

No. 15/250,860, filed on Aug. 29, 2016, now Pat. No. 11,563,695.

(51) Int. Cl.
  *H04L 47/30* (2022.01)
  *H04L 47/32* (2022.01)
  *H04L 49/00* (2022.01)
  *H04L 49/104* (2022.01)
  *H04L 49/90* (2022.01)
  *H04L 49/9005* (2022.01)

(52) U.S. Cl.
  CPC ........ *H04L 49/108* (2013.01); *H04L 49/3036* (2013.01); *H04L 49/9005* (2013.01); *H04L 49/9084* (2013.01)

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,456,590 B1 * | 9/2002 | Ren ................... H04L 49/351 370/371 |
| 6,539,024 B1 | 3/2003 | Janoska et al. |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall et al. |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |

(56) References Cited

U.S. PATENT DOCUMENTS

| | | |
|---|---|---|
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | De La Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall et al. |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,112,818 B1 | 8/2015 | Arad et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lagar-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,686,209 B1 | 6/2017 | Arad et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,838,341 B1 | 12/2017 | Kadosh |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0112814 A1 | 6/2003 | Modali et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalal et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |

(56) References Cited

U.S. PATENT DOCUMENTS

| | | |
|---|---|---|
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subramanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Scholer et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | De Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0185117 A1 | 7/2011 | Beeston et al. |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0307641 A1* | 12/2012 | Arumilli ............... H04L 47/125 370/241 |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |

(56) References Cited

U.S. PATENT DOCUMENTS

| | | |
|---|---|---|
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0064079 A1* | 3/2014 | Kwan .................... H04L 47/12 370/234 |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0105218 A1* | 4/2014 | Anand ................ H04L 47/6255 370/412 |
| 2014/0108474 A1 | 4/2014 | David et al. |
| 2014/0109071 A1 | 4/2014 | Ding |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yang |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | Mcdonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0180787 A1* | 6/2015 | Hazelet .................... H04L 47/29 370/235 |
| 2015/0205974 A1 | 7/2015 | Talley et al. |
| 2015/0207763 A1 | 7/2015 | Bertran Ortiz et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard et al. |
| 2015/0379150 A1 | 12/2015 | Duda |
| 2016/0004611 A1 | 1/2016 | Lakshman et al. |
| 2016/0011815 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong et al. |
| 2016/0292359 A1 | 10/2016 | Tellis et al. |
| 2016/0294696 A1* | 10/2016 | Gafni ..................... H04L 47/10 |
| 2016/0294858 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset et al. |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337010 A1 | 11/2017 | Kriss et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2439637 A1 | 4/2012 |
| EP | 2680155 A1 | 1/2014 |
| GB | 2350028 B | 5/2001 |
| JP | 2000242434 A | 9/2000 |
| TW | I566104 B | 1/2017 |

(56) References Cited

FOREIGN PATENT DOCUMENTS

| WO | 2004077214 A2 | 9/2004 |
|---|---|---|
| WO | 2016003408 A1 | 1/2016 |
| WO | 2016003489 A1 | 1/2016 |

OTHER PUBLICATIONS

Ma A., et al., "RAIDShield: Characterizing, Monitoring, and Proactively Protecting Against Disk Failures," FAST '15, 13th USENIX Conference on File and Storage Technologies, Santa Clara, California, U.S.A, Feb. 16-19, 2015, 17 Pages.
Mahalingam M., et al., "Virtual extensible Local Area Network (VXLAN): A Framework for Overlaying Virtualized Layer 2 Networks over Layer 3 Networks," Independent Submission, RFC 7348, Aug. 2014, 22 pages, Retrieved on URL: http://www.hip.at/doc/rfc/rfc7348.html.
McQuerry S., "Cisco UCS M-Series Modular Servers for Cloud-Scale Workloads," White Paper, Cisco Systems Inc., Sep. 2014, 11 Pages.
Monia C., et al., "IFCP—A Protocol for Internet Fibre Channel Networking: draft-monia-ips-ifcp-00.txt," Dec. 12, 2000, 6 Pages.
Mueen A., et al., "Online Discovery and Maintenance of Time Series Motifs, " KDD'10, The 16th ACM SIGKDD International Conference on Knowledge Discovery and Data Mining, Washington, DC, U.S.A, Jul. 25-28, 2010, 10 Pages.
Muglia B., "Decoding SDN," Juniper Networks, Jan. 14, 2013, pp. 1-7, [Retrieved on Aug. 27, 2015] Retrieved from URL: http://forums.juniper.net/15/The-New-Network/Decoding-SDN/ba-p/174651.
Murray J.F., et al., "Machine Learning Methods for Predicting Failures in Hard Drives: A Multiple-Instance Application," Journal of Machine Learning Research 6, May 2005, 34 Pages.
Nelson M., "File Verification Using CRC," Dr. Dobb's Journal, May 1, 1992, pp. 1-18, XP055130883.
Pace A., "Technologies for Large Data Management in Scientific Computing," International Journal of Modern Physics C, Feb. 2014, vol. 25, No. 2, 72 Pages.
Petersen C., "Introducing Lightning: A flexible NVMe JBOF," Mar. 9, 2016, 6 pages.
Pinheiro E., et al., "Failure Trends in a Large Disk Drive Population," FAST '07, 5th USENIX Conference on File and Storage Technologies, San Jose, California, U.S.A, Feb. 13-16, 2007, 13 Pages.
Raginsky M., et al., "Sequential Anomaly Detection in the Presence of Noise and Limited Feedback," IEEE, Mar. 13, 2012, 19 Pages, arXiv:0911.2904v4 [cs.LG].
Saidi Ali G., et al., "Performance Validation of Network-Intensive Workloads on a Full-System Simulator," Interaction between Operating System and Computer Architecture Workshop, (IOSCA2005), Austin, Texas, Oct. 2005, 10 pages.
Sajassi A., et al., "A Network Virtualization Overlay Solution Using EVPN," L2VPN Workgroup, Nov. 10, 2014, 24 pages, Retrieved from URL: http://tools.Ietf.org/pdf/draft-ietf-bess-evpn-overlay-00.pdf.
Sajassi A., et al., "BGP MPLS Based Ethernet VPN," Network Working Group, Oct. 18, 2014, 52 Pages.
Sajassi A., et al., "Integrated Routing and Bridging in EVPN", L2VPN Workgroup, Nov. 11, 2014, 26 Pages.
Schroeder B., et al., "Disk Failures In The Real World: What Does An MTTF Of 1,000,000 Hours Mean To You?," USENIX Association, FAST '07: 5th USENIX Conference on File and Storage Technologies, San Jose, California, U.S. A, Feb. 13-16, 2007, 16 Pages.
Shue D., et al., "Performance Isolation and Fairness for Multi-Tenant Cloud Storage," USENIX Association, 10th Usenix Symposium on Operating Systems Design Implementation, 2012, 14 pages, Retrieved from URL: https://www.usenix.org/system/files/conference/osdi12/osdi12-final-215.pdf.

Shunra, "Shunra for HP Software, Enabling Confidence in Application Performance Before Deployment," 2010, 2 pages.
Staimer M., "Inside Cisco Systems' Unified Computing System," Cisco, Jul. 2009, 5 Pages, Retrieved from URL: http://searchstorage.techtarget.com/report/Inside-Cisco-Systems-Unified-Computing-System.
Stamey J., et al., "Client-Side Dynamic Metadata in Web 2.0," SIGDOC '07, Oct. 22-24, 2007, pp. 155-161.
Swami V., "Simplifying SAN Management for VMWare Boot from SAN, Utilizing Ciscco UCS and Palo," Posted May 31, 2011, 6 Pages, Retrieved from URL: http://virtualeverything.wordpress.com/2011/05/31/simplifying-san-management-for-vmware-boot-from-san-utilizing-cisco-ucs-and-palo/.
Tate J., et al., "Introduction to Storage Area Networks," IBM, Redbooks, Dec. 2017, vol. 9, 302 Pages, Retrieved from URL: IBM.com/redbooks.
"VBlock Solution for SAP: Simplified Provisioning for Operation Efficiency," VCE White Paper, VCE—The Virtual Computing Environment Company, Aug. 2011, 11 Pages, © 2011 VCE Company LLC, All Rights reserved, Retrieved from URL: http://www.vce.com/pdf/solutions/vce-sap-simplified-provisioning-white-paper.pdf.
Vuppala V., et al., "Layer-3 Switching Using Virtual Network Ports," Computer Communications and Networks, Proceedings of Eighth International Conference in Boston, MA, USA, Piscataway, NJ, USA, IEEE, Oct. 11-13, 1999, pp. 642-648, ISBN: 0-7803-5794-9.
Wang F., et al., "OBFS: A File System for Object-Based Storage Devices," Storage System Research Center, MSST, Apr. 2004, vol. 4, 18 Pages.
Weil S.A., "Ceph: Reliable, Scalable, and High-Performance Distributed Storage," University of California, Santa Cruz, on the Cisco Catalyst 4500 Classic Supervisor Engines, Dec. 2007, 239 Pages, Retrieved from the Internet: URL: https://ceph.com/papers/weil-thesis.pdf.
Weil S.A., et al., "Ceph: A Scalable, High-performance Distributed File System," Proceedings of the 7th symposium on Operating systems design and implementation, USENIX Association, Nov. 6, 2006, 14 Pages.
Weil S.A., et al., "CRUSH: Controlled, Scalable, Decentralized Placement of Replicated Data," Proceedings of the 2006 ACM/IEEE conference on Supercomputing, ACM, Nov. 11, 2006, 12 Pages.
Wikipedia, The Free Encyclopedia: "Standard RAID Levels," Last updated Jul. 18, 2014, 7 Pages, Retrieved from URL: http://en.wikipedia.org/wik/Standard_RAID_levels.
Wu J., et al., "The Design, and Implementation of AQuA: An Adaptive Object-Based Storage Device," Department of Computer Science, MSST, May 17, 2006, 25 Pages, Retrieved from URL: http://storageconference.us/2006/Presentations/30Wu.pdf.
Xue C., et al., "A Standard Framework For Ceph Performance Profiling With Latency Breakdown," CEPH, Jun. 30, 2015, 3 Pages.
Zhou Z., et al., "Stable Principal Component Pursuit," Jan. 14, 2010, 5 Pages, arXiv:1001.2363v1 [cs.IT].
Zhu Y., et al., "A Cost-based Heterogeneous Recovery Scheme for Distributed Storage Systems with RAID-6 Codes," University of Science Technology of China, 2012, 12 Pages.
"Appendix D: Configuring In-Band Management," Sun Storage Common Array Manager Installation and Setup Guide, Version 6.7.x 821-1362-10, Sun Oracle, Copyright © 2010, Oracle and/or its affiliates, 15 Pages, [Retrieved and Printed Sep. 12, 2013], Retrieved from URL: http://docs.oracle.com/cd/E19377-01/821-1362-10/index.html.
Author Unknown, "5 Benefits of a Storage Gateway in the Cloud," Blog, TwinStrata, Inc., Jul. 25, 2012, XP055141645, 4 pages.
Author Unknown, "Coraid EtherCloud, Software-Defined Storage with Scale-Out Infrastructure," Solution Brief, Coraid, Redwood City, California, U.S.A, 2013, 2 pages.
Author Unknown, "Creating Performance-Based SAN SLAs Using Finisar's NetWisdom," Finisar Corporation, Sunnyvale, California, U.S.A, May 2006, 7 pages.
Author Unknown, "Data Center, Metro Cloud Connectivity: Integrated Metro SAN Connectivity in 16 Gbps Switches," Brocade Communication Systems, Inc., Apr. 2011, 14 pages.

(56) References Cited

OTHER PUBLICATIONS

Author Unknown, "Data Center, San Fabric Administration Best Practices Guide, Support Perspective," Brocade Communication Systems, Inc., May 2013, 21 pages.
Author Unknown, "Delphi-Save a CRC Value in a File, Without Altering the Actual CRC Checksum?," Stack Overflow, Stackoverflow. com, Dec. 23, 2011, 3 pages, XP055130879, Retrieved from URL: http://stackoverflow.com/questions/8608219/save-a-crc-value-in-a-file-wihout-altering-the-actual-crc-checksum.
Author Unknown, "EMC Unisphere: Innovative Approach to Managing Low-End and Midrange Storage, Redefining Simplicity in the Entry-Level and Midrange Storage Markets," Data Sheet, EMC Corporation, Published on or about Jan. 4, 2013, 6 pages, [Retrieved on Sep. 12, 2013], Retrieved from URL: http://www.emc.com/storage/vnx/unisphere.html.
Author Unknown, "Joint Cisco and VMWare Solution for Optimizing Virtual Desktop Delivery: Data Center 3.0: Solutions to Accelerate Data Center Virtualization," Cisco Systems Incorporated, VMware Incorporated, Sep. 2008, 10 Pages.
Author Unknown, "Network Transformation with Software-Defined Networking and Ethernet Fabrics," Positioning Paper, 2012, 6 pages, Brocade Communications Systems.
Author Unknown., "Software Defined Networking: The New Norm for Networks," ONF White Paper, Open Networking Foundation, Apr. 13, 2012, 12 Pages.
Author Unknown, "Software Defined Storage Networks an Introduction," White Paper, Doc # 01-000030-001 Rev. A, Jeda Networks, Newport Beach, California, U.S.A, Dec. 12, 2012, 8 pages.
Author Unknown, "The Fundamentals of Software-Defined Storage, Simplicity at Scale for Cloud-Architectures," Solution Brief, Coraid, Redwood City, California, U.S.A, 2013, 3 pages.
Author Unknown., "Storage Area Network—NPIV: Emulex Virtual HBA and Brocade, Proven Interoperability and Proven Solution," Emulex and Brocade Communications Systems, Technical Brief, Apr. 2008, 4 Pages.
Author Unknown, "Storage Infrastructure for the Cloud," Solution Brief, Coraid, Redwood City, California, U.S.A, 2012, 3 pages.
Author Unknown., "VirtualWisdom SAN Performance Probe Family Models: Probe FC8, Hd, and HD48," Virtual Instruments DataSheet, Apr. 2014, 4 Pages.
Author Unknown., "Xgig Analyzer: Quick Start Feature Guide 4.0," Finisar Corporation, Sunnyvale, California, U.S.A, Feb. 2008, 24 Pages.
Aweya J., et al., "Multi-Level Active Queue Management With Dynamic Thresholds," Computer Communication, Elsevier Science Publishers BV, Amsterdam, NL, May 15, 2002, vol. 25, No. 8, pp. 756-771, DOI:10.1016/S0140-3664(01)00403-0, ISSN 0140-3664, XP004335453.
Berman S., et al., "Start-Up Jeda Networks in Software Defined Storage Networks Technology," Storage News Letter, Press Release, Feb. 25, 2013, 2 pages, [Retrieved from Jun. 16, 2013] Retrieved from URL: http://storagenewsletter.com/news/startups/jeda-networks.
Borovick L, et al., "Architecting the Network for the Cloud," IDC White Paper, Jan. 2011,8 pages.
Chakrabarti K., et al., "Locally Adaptive Dimensionality Reduction for Indexing Large Time Series Databases," ACM Transactions on Database Systems, Jun. 2002, vol. 27, No. 2, pp. 188-228.
Chandola V., et al., "A Gaussian Process Based Online Change Detection Algorithm for Monitoring Periodic Time Series," Proceedings of the Eleventh SIAM International Conference on Data Mining, SDM, Apr. 28-30, 2011, 12 Pages.
Choudry A.K., et al., "Dynamic Queue Length Thresholds for Shared-Memory Packet Switches," IEEE/ACM Transactions on Networking, Apr. 1998, vol. 6, No. 2, 29 Pages.
CISCO "N-Port Virtualization in the Data Center," Cisco White Paper, Cisco Systems, Inc., Mar. 2008, 6 Pages, Retrieved from URL: http://www.cisco.com/en/US/prod/collateral/ps4159/ps6409/ps5989/ps9898/white—paper—c11-459263.html.
Cisco Systems Inc., "Best Practices in Deploying Cisco Nexus 1000V Series Switches on Cisco UCS B and C Series Cisco UCS Manager Servers," Cisco White Paper, Apr. 2011, Retrieved from URL: http://www.cisco.com/en/US/prod/collateral/switches/ps9441/ps9902/whitepaperc11-558242.pdf, 36 Pages.
Cisco Systems Inc: "Cisco Prime Data Center Network Manager 6.1," At-A-Glance, 2012, 3 Pages.
Cisco Systems Inc: "Cisco Prime Data Center Network Manager: Release 6.1," Data Sheet, 2012, 10 Pages.
Cisco Systems Inc., "Cisco Unified Network Services: Overcome Obstacles to Cloud-Ready Deployments," Cisco White Paper, Jan. 2011,6 Pages.
Clarke A., et al., "Open Data Center Alliance Usage: Virtual Machine (VM) Interoperability in a Hybrid Cloud Environment Rev. 1.2," Open Data Center Alliance, 2013, pp. 1-18.
"Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 Pages, Retrieved from URL: http://publib.boulder.IBM.com/infocenter/svc/ic/index.jsp?topic=%2Fcom.IBM.storage.svc.console.doc%2Fsvc—fastcontconfint—1ev5ej.html.
"Coraid Virtual DAS (VDAS) Technology, Eliminate Tradeoffs Between DAS and Networked Storage," Coraid Technology Brief, 2013, @Coraid, Inc., Published on or about Mar. 20, 2013, 2 pages, Retrieved from URL: http://san.coraid.com/rs/coraid/images/TechBrief-Coraid-VDAS.pdf.
Cummings R., et al., "Fibre Channel-Fabric Generic Requirements (FC-FG)," American National Standards Institute, Inc., New York, U.S.A., Dec. 4, 1996, 33 Pages.
Farber F., et al., "An In-Memory Database System for Multi-Tenant Applications," Proceedings of 14th Business, Technology and Web (BTW) Conference on "Database Systems for Business, Technology, and Web", University of Kaiserslautern, Germany, Feb. 28-Mar. 4, 2011, 17 Pages, Retrieved from URL: http://cs.emis.de/LNI/Proceedings/Proceedings180/650.pdf.
Guo C.J., et al., "IBM Research Report: Data Integration and Composite Business Services, Part 3, Building a Multi-Tenant Data Tier with with Access Control and Security," RC24426 (C0711-037), Computer Science, Nov. 19, 2007, 20 Pages.
Hatzieleftheriou A., et al., "Host-side Filesystem Journaling for Durable Shared Storage," USENIX Association, 13th USENIX Conference on File and Storage Technologies (FAST '15), Feb. 16-19, 2015, 9 Pages, Retrieved from URL: https://www.usenix.org/system/files/conference/fast15/fast15-paper-hatzieleftheriou.pdf.
Hedayat K., et al., "A Two-Way Active Measurement Protocol (TWAMP)," Network Working Group, RFC 5357, https://www.rfc-editor.org/rfc/rfc5357.html, Oct. 2008, 26 Pages.
Horn C., et al., "Online Anomaly Detection With Expert System Feedback in Social Networks," IEEE International Conference on Acoustics, Speech and Signal Processing (ICASSP), Prague, [Abstract only], May 22-27, 2011, 2 pages.
Hosterman C., et al., "Using EMC Symmetrix Storage inVMware vSphere Environments," Version 8.0, EMC2Techbooks, EMC Corporation, Published on or about Jul. 8, 2008, 314 Pages, [Retrieved and Printed Sep. 12, 2013], Retrieved from URL: http://www.emc.com/collateral/hardware/solution-overview/h2529-vmware-esx-svr-w-symmetrix-wp-Idv.pdf.
"HP XP Array Manager Software-Overview Features," Storage Device Management Software, Hewlett-Packard Development Company, 2013, 3 pages, @ Hewlett-Packard Development Company, L.P, [Retrieved on Sep. 12, 2013], Retrieved from URL: http://h18006.www1.hp.com/products/storage/software/amsxp/index.html.
Hu Y., et al., "Cooperative Recovery of Distributed Storage Systems from Multiple Losses with Network Coding," IEEE Journal on Selected Areas in Communications, University of Science Technology of China, vol. 28, No. 2, Feb. 2010, 9 Pages.
International Preliminary Report on Patentability for International Application No. PCT/US2017/043463, mailed Mar. 14, 2019, 8 Pages.

(56) References Cited

OTHER PUBLICATIONS

International Search Report and Written Opinion for International Application No. PCT/US2017/043463, mailed Oct. 16, 2017, 9 Pages.

Juniper Networks, Inc., "Recreating Real Application Traffice in Junosphere Lab," Solution Brief, Dec. 2011, 3 pages.

Keogh E., et al., "Dimensionality Reduction for Fast Similarity Search in Large Time Series Databases," Knowledge and Information Systems Long Paper, May 16, 2000, 19 Pages.

Kolyshkin K., "Virtualization in Linux," Sep. 1, 2006, 5 pages, XP055141648, Retrieved from URL: https://web.archive.org/web/20070120205111/ http://download.openvz.orq/doc/openvz-intro.pdf.

Kovar J.F., "Startup Jeda Networks Takes SDN Approach to Storage Networks," CRN Press Release, Feb. 22, 2013, 1 Page, [Retrieved on Jun. 16, 2013] Retrieved from URL: http://www.crn.com/240149244/printablearticle.htm.

Lampson B.W., et al., "Crash Recovery in a Distributed Data Storage System," Jun. 1, 1979, 28 Pages.

Lewis M.E., et al., "Design of an Advanced Development Model Optical Disk-Based Redundant Array of Independent Disks (RAID) High Speed Mass Storage Subsystem," Final Technical Report, Oct. 1997, pp. 1-211.

Lin J., et al., "Finding Motifs in Time Series," SIGKDD'02, Edmonton, Alberta, Canada, Jul. 23-26, 2002, 11 Pages.

Linthicum D., "VM Import Could be a Game Changer for Hybrid Clouds," InfoWorld, Dec. 23, 2010, 4 pages.

\* cited by examiner

QUEUE PROTECTION USING A SHARED GLOBAL MEMORY RESERVE

CROSS-REFERENCE TO RELATED APPLICATIONS

This application is a continuation of U.S. patent application Ser. No. 18/153,923, filed Jan. 12, 2023, which in turn is a continuation of U.S. patent application Ser. No. 15/250,860, filed on Aug. 29, 2016, now U.S. Pat. No. 11,563,695, the full disclosures of which are hereby expressly incorporated by reference in their entirety.

TECHNICAL FIELD

The subject technology pertains to managing memory resources in a network switch and in particular, for managing a shared buffer memory amongst multiple queues in a shared memory network switch.

BACKGROUND

Several different architectures are commonly used to build packet switches (e.g., IP routers, ATM switches and Ethernet switches). One architecture is the output queue (OQ) switch, which places received packets in various queues that are dedicated to outgoing ports. The packets are stored in their respective queues until it is their turn to depart (e.g. to be "popped"). While various types of OQ switches have different pros and cons, a shared memory architecture is one of the simplest techniques for building an OQ switch. In some implementations, a shared memory switch functions by storing packets that arrive at various input ports of the switch into a centralized shared buffer memory. When the time arrives for the packets to depart, they are read from the shared buffer memory and sent to an egress line.

There are various techniques for managing a shared memory buffer. In some memory management solutions, the network switch prevents any single output queue from taking more than a specified share of the buffer memory when the buffer is oversubscribed, and permits a single queue to take more than its share to handle incoming packet bursts if the buffer is undersubscribed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Overview

One problem with managing shared memory space amongst multiple queues is to ensure that active queues (i.e., "aggressor queues") do not occupy the entire memory and thereby impede buffer access by other queues. Queues that are prevented from enqueue due to limited buffer space are referred to herein as "victim queues." In a shared memory switch, an algorithm is required to prevent any single queue from taking more than its fair allocation of shared memory. In some memory management solutions, the algorithm calculates a dynamic maximum threshold by multiplying the amount of unallocated/free memory in the shared memory by a parameter (e.g., "alpha"). Typically values of alpha range between 0.5 and 2.0.

With alpha set to 1.0 consider a single oversubscribed queue: the system stabilizes with the queue and the free memory both being the same size, i.e., the queue can consume only half of memory. With 2 oversubscribed queues the queues can each have $\frac{1}{3}^{rd}$ of the memory and $\frac{1}{3}^{rd}$ remains unallocated, and so on up to N oversubscribed queues, where each queue will have $1/(N+1)$ of the memory and $1/(N+1)$ will remain unallocated. An example of the relative memory allocation amongst multiple queues is discussed in further detail with respect to FIG. 1A, below.

In some data center deployments, the buffer is required to be able to absorb large data bursts into a single queue (e.g., incast burst absorption). So the "alpha" parameter (which is programmable), is usually set to greater than 1, typically 9 (e.g., 90% of the buffer). With this setting, few aggressor queues/concurrent bursts could consume the entire buffer, and any new incoming traffic is dropped (e.g. a tail-drop), affecting throughput for victim queues.

Another solution is to provide a dedicated memory allocation for each queue (e.g., a minimum reserve), and reduce the total shareable buffer space by the sum of all minimum reserves. Depending on implementation, this can result in carving out a section of the buffer memory that isn't efficiently used. Additionally, the amount of reserved buffer space is a function of the number of ports and classes of service required, so as the number of ports/services scale, dedicated memory allocations become increasingly likely to deplete available memory.

DESCRIPTION

Aspects of the subject technology address the foregoing problem by providing memory management systems, methods and computer-executable instructions to facilitate packet storage using a shared buffer memory. In particular, the disclosed technology provides a packet enqueuing method which requires certain preconditions before a received packet can be enqueued. In some aspects, the decision of whether or not to enqueue a packet is first based on a fill level of the shared buffer memory. That is, if an occupancy of the queue in the shared buffer memory is below a pre-determined dynamic queue threshold (e.g., a "dynamic queue maximum" or "dynamic queue MAX"), then the packet is enqueued.

Alternatively, in instances where the queue occupancy in the shared buffer exceeds the dynamic queue max threshold, then further conditions may be verified before the packet is enqueued (or dropped). As discussed in further detail below, if the fill level of the queue in the shared buffer memory exceeds the dynamic queue max threshold, then an occupancy of the referring queue may be compared to static queue threshold (e.g., a "static queue minimum" or "static queue MIN"), to determine if the packet can still be enqueued.

As used herein, the dynamic queue maximum refers to a measure of shared buffer occupancy for the entire shared buffer memory. Thus, the dynamic queue max can be understood as a function of total free/available memory in the buffer. As discussed in further detail below, the static queue minimum threshold is a threshold that relates to a minimum amount of memory in the shared buffer that is allocated for use by victim queues.

Figure 1A:
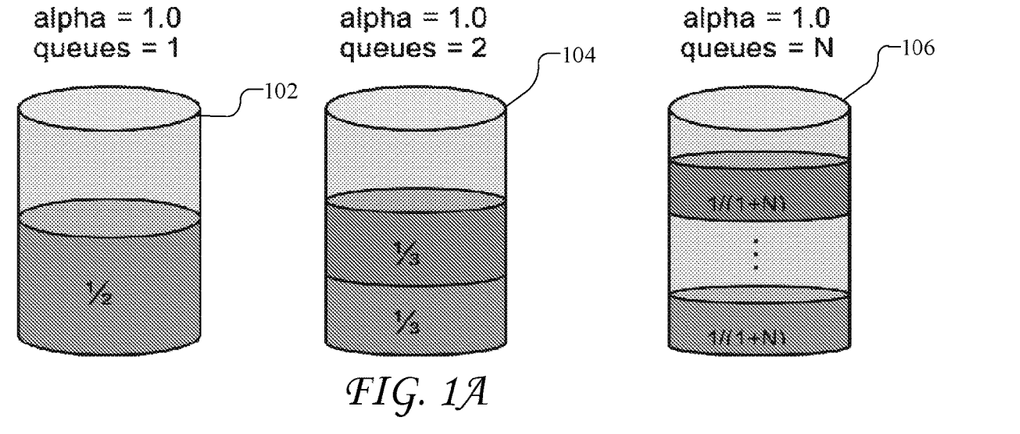
FIG. 1A graphically illustrates an example of queue occupancy relative to free buffer memory in a shared memory network switch.

FIG. 1A graphically illustrates an example of queue occupancy levels relative to a free shared buffer memory allocation in a network switch. For example, shared buffer 102 illustrates an example in which a shared buffer occupancy is maximally allocated at ½ of the total memory capacity, i.e., for a single queue wherein alpha=1.0. Shared buffer 104 illustrates an example of a total buffer allocation for two total queues, wherein the respective shared buffer memory allocation for each is $\frac{1}{3}^{rd}$ of the of the total buffer size. Similarly, shared buffer 106 illustrates an example of a shared buffer allocation amongst N total queues.

Figure 1B:
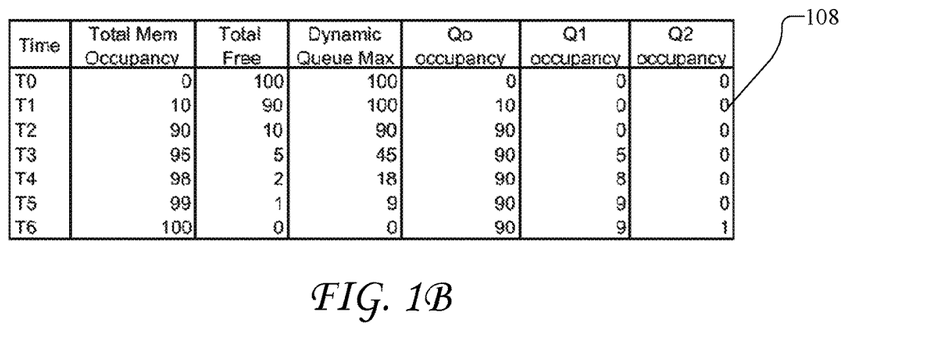
FIGS. 1B and 1C illustrate examples of memory allocation tables that indicate occupancy for various queues, as well as a total available free memory resource for a shared buffer memory.

FIG. 1B illustrates an example memory allocation table 108 that indicates occupancy for multiple queues, as well as a total free memory for a shared buffer.

In particular, the example of FIG. 1B illustrates a memory management scheme in which any queue is permitted to occupy the entirety of shared buffer memory. As table 108 illustrates, this memory management method can be problematic due to the fact that aggressor queues can rapidly utilize the entirety of shared memory space, consequently halting the ability for victim queues to enqueue additional incoming packets.

By way of example, table 108 illustrates various occupancy levels for multiple queues (i.e., $Q_0$, $Q_1$, and $Q_2$), such that any individual queue is permitted to utilize all available free memory. This scenario is demonstrated, for example, at time=T5 where $Q_0$, and $Q_1$ occupy 90% and 9% of the total memory, respectively (leaving a total free memory of 1%).

Figure 1C:
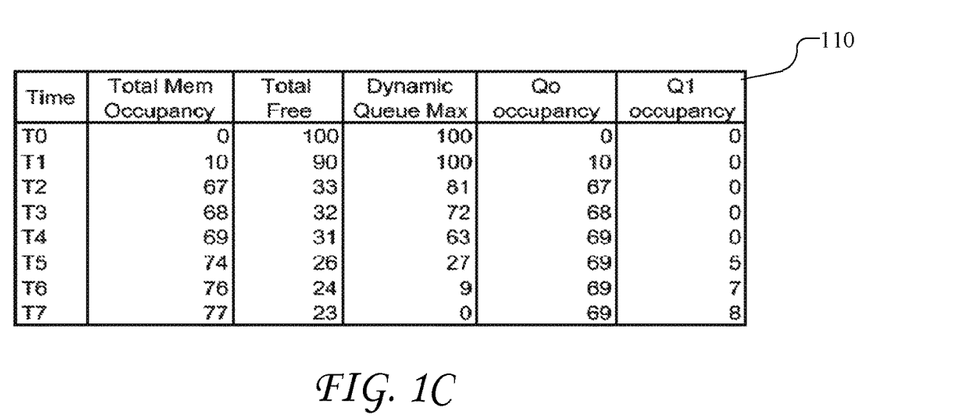

FIG. 1C illustrates an example memory allocation table 110 that indicates occupancy levels for multiple queues using a memory management technique that employs a dedicated "minimum reserve" for each respective queue. As discussed above, such solutions can also be sub-optimal due to the fact that some amount of shared buffer memory can be persistently reserved for inactive queues, even when memory resources are needed elsewhere. For example, using a per-queue memory reservation technique depicted by FIG. 1C (e.g., with alpha=9) a total of 25% of the total buffer memory is reserved for various queues.

By way of example, table 110 illustrates this scenario at time=T7, where $Q_0$ occupancy is at 69 (e.g., 69% of the shared buffer size), and $Q_1$ occupancy is at 8 (e.g., 8% of the shared buffer size), however, dynamic queue max=0, indicating that free memory (e.g., total free=23) is no longer available to other aggressor queues. Therefore, in this scenario, a total of 23% of the shared buffer memory is unallocated if all victim queues are unutilized.

As discussed above, aspects of the subject technology address the foregoing limitations of conventional buffer memory management techniques, by providing a shared buffer memory in which packet enqueuing is dependent upon the verification of various conditions, for example, relating to a fill level of the shared buffer (e.g., a dynamic queue max threshold), as well as comparisons between a fill level of a referring queue and a threshold related to a reserved apportionment of buffer resources (e.g., a static queue min threshold).

Figure 2:
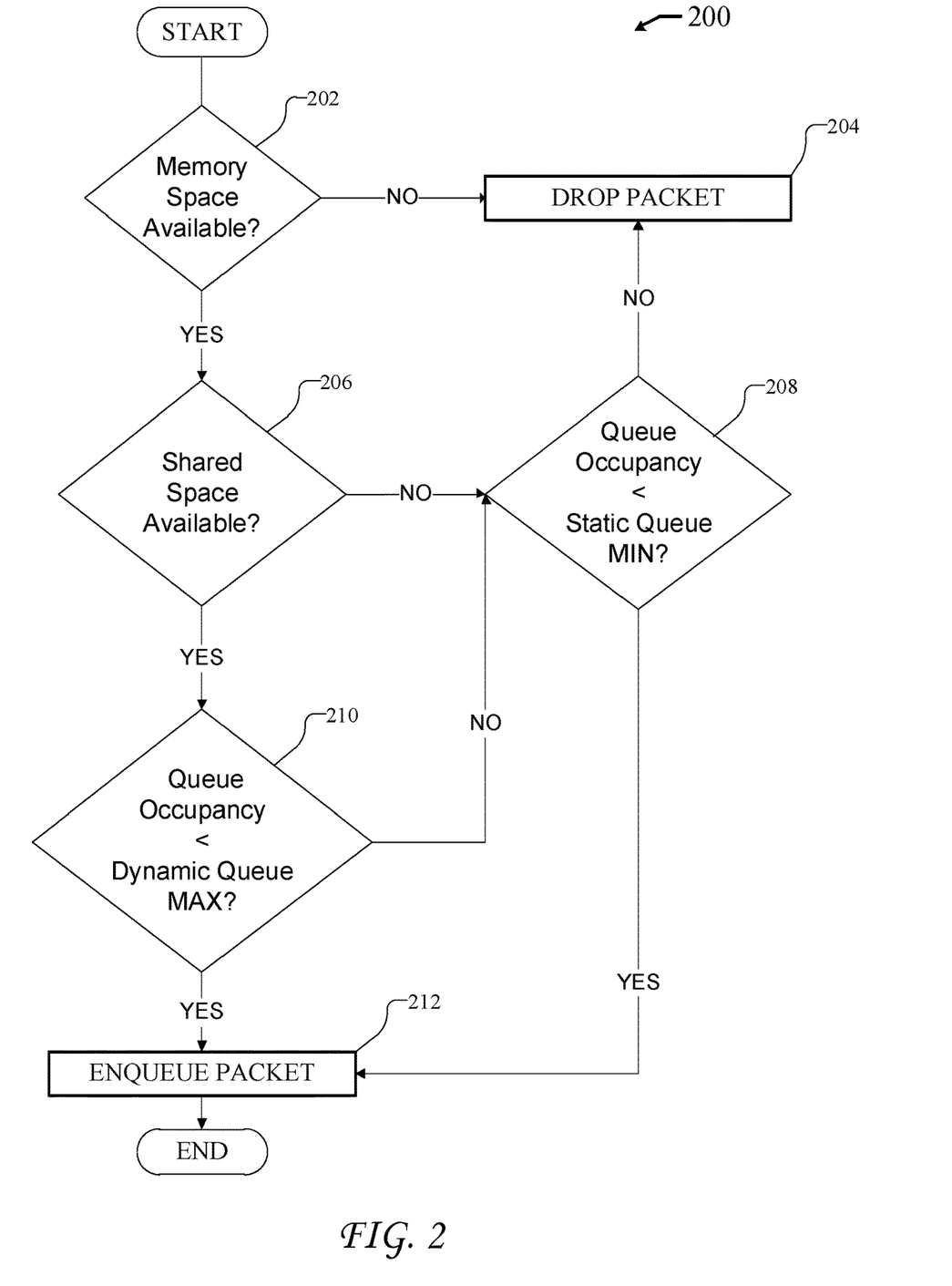
FIG. 2 illustrates an example flow chart for implementing a shared buffer memory allocation algorithm utilizing a global shared reserve, according to some aspects of the technology.

FIG. 2 illustrates an example flow chart for implementing a method 200 for allocating shared buffer memory in a network switch. Method 200 begins at step 202, in which a determination is made as to whether there is any available (unallocated) memory in the shared buffer of a network switch. If it is determined that no free memory is available, method 200 proceeds to step 204, and any newly arriving packets are dropped.

Alternatively, if it is determined that the shared buffer memory contains unallocated space, method 200 proceeds to step 206, in which a determination is made as to whether any shared buffer space is available in the shared buffer memory.

If it is determined in step 206 that no memory in the shared buffer is available, then method 200 proceeds to step 208, in which a determination is made as to whether or not the occupancy of the referring queue is below a predetermined static queue minimum, e.g., a "static queue MIN" threshold, as discussed above. In some aspects, the static queue MIN threshold is a predetermined threshold used to define a minimum threshold, above which the received data/packets from a referring queue cannot be accepted into the shared buffer memory. As such, if in step 208 it is determined that the referring queue occupancy is not less than the static queue minimum, then method 200 proceeds to step 204 and incoming packet/s are dropped.

Alternatively, if in step 208 it is determined that the referring queue occupancy is less than the static queue MIN threshold, method 200 proceeds to step 212, and data from the referring queue is stored in a "reserved portion" of the shared buffer memory. It is understood herein that the reserved portion of buffer memory (or "global reserve") refers to a logical allotment of memory space in the shared buffer. However, it is not necessary that the global reserve portions of memory be physically distinct memory spaces that are separate, for example, from various other regions in the shared memory buffer.

Referring back to step 206, if it is determined that shared memory space is available, then method 200 proceeds to step 210 in which a determination is made as to whether the queue occupancy is less than a dynamic queue threshold (e.g., "dynamic queue MAX"). As used herein, the dynamic queue max is a threshold that defines a cutoff, above which data from an aggressor queue cannot be admitted into the shared buffer memory. Because the dynamic queue max is a function of unallocated memory space in the shared buffer memory, in some aspects the dynamic queue max threshold may be conceptualized as a function of queue activity for each associated queue in the network switch.

If in step 210 it is determined that the queue occupancy is less than the dynamic queue max, then method 200 proceeds to step 212 and the packet/s are stored in the buffer memory. Alternatively, if it is determined that the queue occupancy (e.g., queue allocation) is greater than the dynamic queue max threshold, then method 200 proceeds to step 208, where it is determined if the referring queue occupancy is less than the static queue minimum (see above).

By providing a global reserve buffer available to any referring queue that has less than a specified occupancy level, the subject memory management techniques permit data storage in the shared buffer by less active (victim) queues, even in instances where the majority of buffer storage space has been filed by aggressor queues.

Figure 3A:
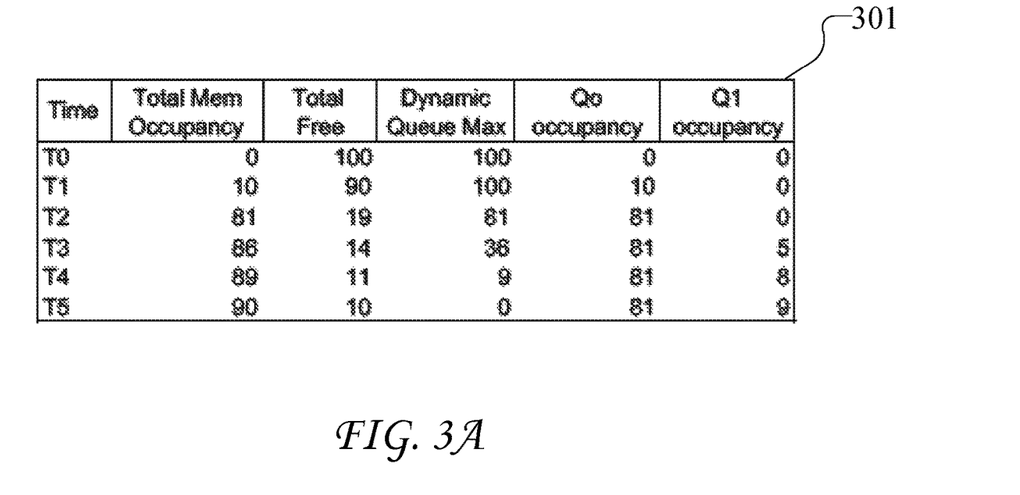
FIG. 3A illustrates an example table of queue occupancy levels for multiple queues implementing a global shared reserve memory management technique, according to some aspects of the technology.

FIG. 3A illustrates an example table 301 of queue occupancy levels for multiple queues implementing a shared memory management technique, as discussed above. By implementing the memory management scheme discussed with respect to method 200 above, victim queues with relatively low throughput (as compared to aggressor queues) can access portions of shared buffer memory that would otherwise be unavailable in other shared memory schemes. As illustrated in table 301, for example, at time=T5, victim queue ($Q_1$) is able to occupy some amount of the total buffer memory (e.g., 9%), although aggressor queue $Q_1$ has occupied most of the shared buffer. A similar example is graphically illustrated with respect to FIG. 3B.

Figure 3B:
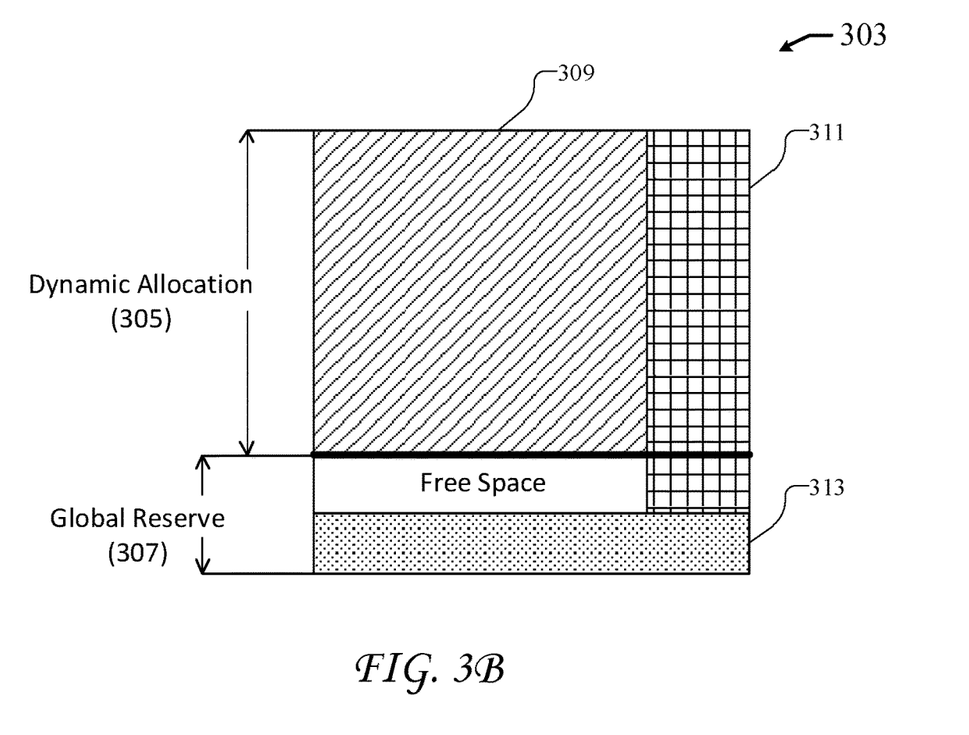
FIG. 3B graphically illustrates an example of memory allocated to a shared buffer memory by various queues using a global shared reserve memory management technique, according to some aspects of the technology.

Specifically, FIG. 3B illustrates an example of the apportionment of a memory 303 amongst multiple queues (e.g., first queue 309, second queue 311, and third queue 313), using a global shared reserve management technique, according to aspects of the subject technology. As illustrated, memory 303 is logically apportioned into a dynamic allocation 305 and a global reserve 307. As discussed above, dynamic allocation 305 can be a shared resource available to any aggressor queue until an occupancy level of that queue has reached a pre-determined threshold (e.g., a dynamic queue max). However, the global reserve 307 of memory 303 remains reserved for low volume or victim queues, so long as the occupancy of the referring queue does not exceed a pre-determined threshold governing storage to the global reserve (e.g., a static queue min threshold), as discussed above with respect to step 208 of method 200.

By way of example, the occupancy of buffer memory 303 in the example of FIG. 3B illustrates storage by three different queues. The storage of data pertaining to first queue 309 is managed solely within dynamic allocation 305. The storage of data pertaining to second queue 311 is shared amongst dynamic allocation 305 and global reserve 307, and data associated with third queue 313 is stored exclusively into global reserve 307.

As discussed above, storage of data from second queue 311 first began by storing data to dynamic allocation 305, until occupancy of dynamic allocation 305 was complete. After dynamic allocation 305 reached capacity, a determination was made as to whether the remaining data in second queue 311 was smaller than a static queue threshold, necessary to admit the data into the global reserve. Lastly, data from third queue 313, which could not have been stored to dynamic allocation 305 (due to its fill state), was exclusively stored into global reserve 307.

By maintaining global reserve 307 portion of buffer memory 303, the disclosed memory management technique provides for a minimal apportionment of shared buffer space that is continuously available to victim queues.

Example Devices

Figure 4:
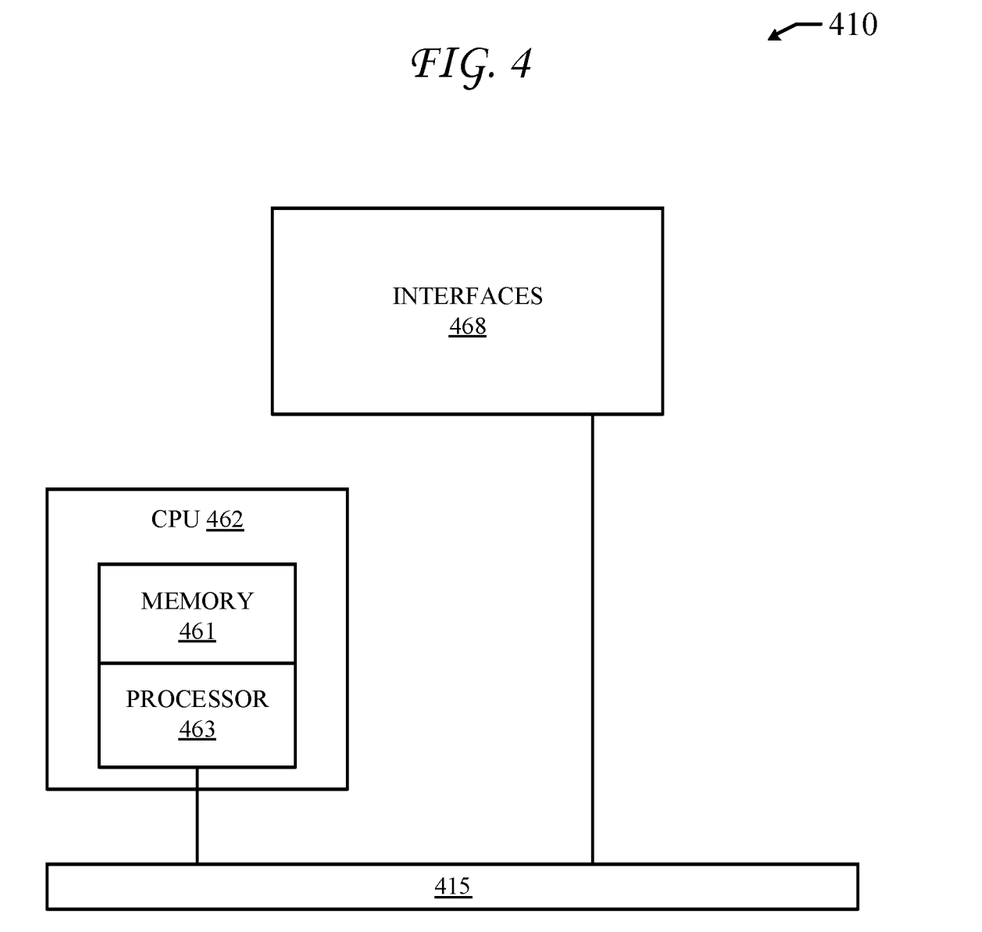
FIG. 4 illustrates an example network device.

FIG. 4 illustrates an example network device 410 suitable for high availability and failover. Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5A:
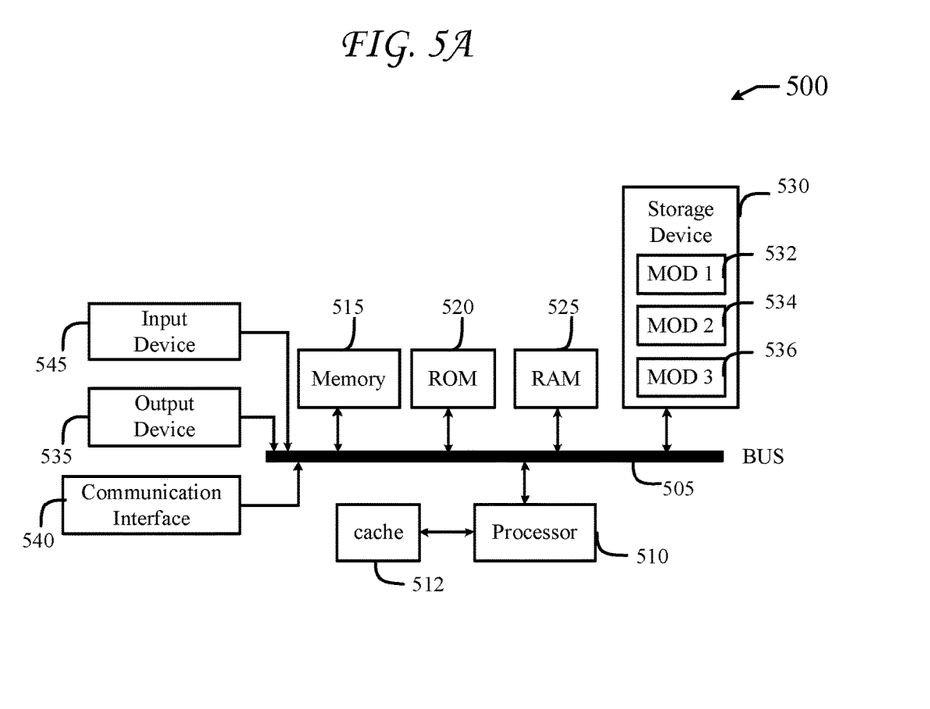
FIGS. 5A and 5B illustrate example system embodiments.
Figure 5B:
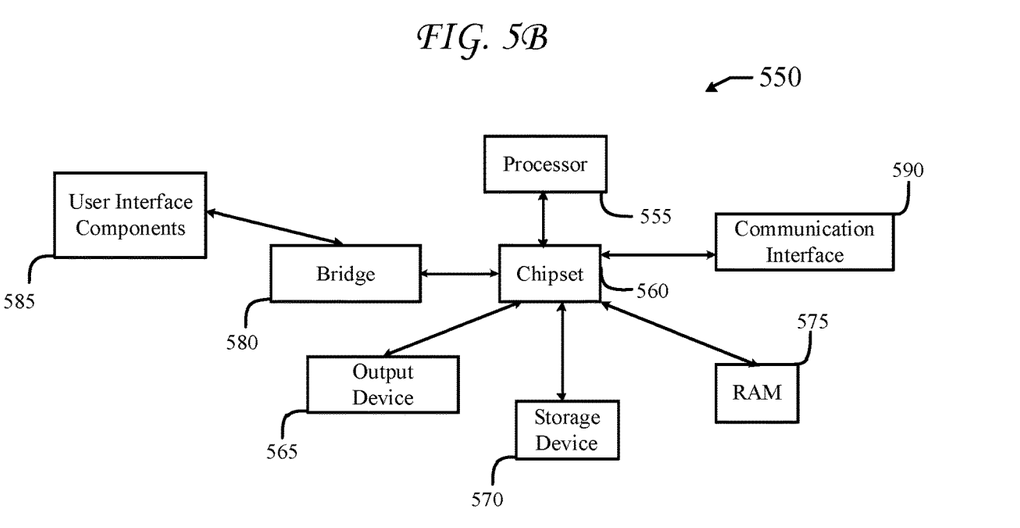

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method of managing memory in a network switch, the method comprising:
   configuring a memory space to have a first shared allocated space, wherein the first shared allocated space is associated with a dynamic maximum threshold that is a function of available space in the first shared allocated space, and a second shared allocated space,
   wherein the memory space is associated with a plurality of ports including a first port, wherein the first port is associated with a first queue for enqueuing packets within the memory space;
   upon receiving a packet on the first port, comparing a fill level of the first queue to the dynamic maximum threshold;
   upon determining that the fill level of the first queue is below the dynamic maximum threshold, enqueuing the packet in the first shared allocated space; and
   upon determining that the fill level of the first queue is above the dynamic maximum threshold, enqueuing the packet in the second shared allocated space.

2. The method of claim 1, further comprising:
   after receiving the packet on the first port, determining if there is any space available in the first shared allocated space.

3. The method of claim 1, further comprising:
   upon receiving the packet and before comparing a fill level of the first queue to the dynamic maximum threshold, determining if there is any unallocated space available in the memory that includes the first shared allocated space and the second shared allocated space.

4. The method of claim 3, further comprising:
   upon determining that there is no unallocated space available in the memory that includes the first shared allocated space and the second shared allocated space, dropping the packet.

5. The method of claim 1, further comprising:
   before comparing a fill level of the first queue to the dynamic maximum threshold, determining if the first shared allocated space is above a designated fill level.

6. The method of claim 1, wherein the method further comprises: upon determining that the first shared allocated space is above a designated fill level, identifying whether the memory allocated to the packets from the first port is below a minimum threshold.

7. The method of claim 6, wherein the method further comprises: upon identifying that the memory allocated to the packets from the first port is below the minimum threshold, enqueuing the packet.

8. A shared memory network switch comprising:
   at least one processor;
   a plurality of ports;
   a buffer memory;
   a memory device storing instructions that, when executed by the at least one processor, cause the at least one processor to perform operations comprising:
      configuring the buffer memory to have a first shared allocated space, wherein the first shared allocated space is associated with a dynamic maximum threshold that is a function of available space in the first shared allocated space, and a second shared allocated space;
      associating a first port of the plurality of ports with a first queue for enqueuing packets within a first allocated memory space;
      upon receiving a packet on the first port, comparing a fill level of the first queue to the dynamic maximum threshold;
      upon determining that the fill level of the first queue is below the dynamic maximum threshold, enqueuing the packet in the first shared allocated space; and
      upon determining that the fill level of the first queue is above the dynamic maximum threshold, enqueuing the packet in the second shared allocated space.

9. The shared memory network switch of claim 8, wherein the operations further comprise:
   after receiving the packet on the first port, determining if there is any space available in the first shared allocated space.

10. The shared memory network switch of claim 8, wherein the operations further comprise:
    upon receiving the packet and before comparing a fill level of the first queue to the dynamic maximum threshold, determining if there is any unallocated space available in the memory that includes the first shared allocated space and the second shared allocated space.

11. The shared memory network switch of claim 10, wherein the operations further comprise:
    upon determining that there is no unallocated space available in the memory that includes the first shared allocated space and the second shared allocated space, dropping the packet.

12. The shared memory network switch of claim 8, wherein the operations further comprise:
    before comparing the fill level of the first queue to the dynamic maximum threshold, determining if the first shared allocated space is above a designated fill level.

13. The shared memory network switch of claim 8, wherein the operations further comprise:
    upon determining that the first shared allocated space is above a designated fill level, identifying whether the memory allocated to the packets from the first port is below a minimum threshold.

14. The shared memory network switch of claim 13, wherein the operations further comprise:
  upon identifying that the memory allocated to the packets from the first port is below the minimum threshold, enqueuing the packet.

15. A non-transitory computer-readable storage medium comprising instructions stored therein, which when executed by one or more processors, cause the one or more processors to perform operations comprising:
  configuring a buffer memory to have a first shared allocated space, wherein the first shared allocated space is associated with a dynamic maximum threshold that is a function of available space in the first shared allocated space, and a second shared allocated space;
  associating a first port of a plurality of ports with a first queue for enqueuing packets within a first allocated memory space;
  upon receiving a packet on the first port, comparing a fill level of the first queue to the dynamic maximum threshold;
  upon determining that the fill level of the first queue is below the dynamic maximum threshold, enqueuing the packet in the first shared allocated space; and
  upon determining that the fill level of the first queue is above the dynamic maximum threshold, enqueuing the packet in the second shared allocated space.

16. The non-transitory computer-readable storage medium of claim 15, wherein the operations further comprise:
  after receiving the packet on the first port, determining if there is any space available in the first shared allocated space.

17. The non-transitory computer-readable storage medium of claim 15, wherein the operations further comprise:
  upon receiving the packet and before comparing a fill level of the first queue to the dynamic maximum threshold, determining if there is any unallocated space available in the memory that includes the first shared allocated space and the second shared allocated space.

18. The non-transitory computer-readable storage medium of claim 17, wherein the operations further comprise:
  upon determining that there is no unallocated space available in the memory that includes the first shared allocated space and the second shared allocated space, dropping the packet.

19. The non-transitory computer-readable storage medium of claim 15, wherein the operations further comprise:
  before comparing the fill level of the first queue to the dynamic maximum threshold, determining if the first shared allocated space is above a designated fill level.

20. The non-transitory computer-readable storage medium of claim 15, wherein the operations further comprise:
  upon determining that the first shared allocated space is above a designated fill level, identifying whether the memory allocated to the packets from the first port is below a minimum threshold, and
  upon identifying that the memory allocated to the packets from the first port is below the minimum threshold, enqueuing the packet.

* * * * *